Feb. 16, 1954  J. C. BURDETT  2,669,683

TWO-SPEED SINGLE-PHASE INDUCTION MOTOR

Filed Nov. 28, 1951

WITNESSES:

INVENTOR
John C. Burdett
BY
ATTORNEY

Patented Feb. 16, 1954

2,669,683

UNITED STATES PATENT OFFICE 2,669,683

TWO-SPEED SINGLE-PHASE INDUCTION MOTOR

John C. Burdett, Lima, Ohio, assignor to Westinghouse Electric Corporation, East Pittsburgh, Pa., a corporation of Pennsylvania Application November 28, 1951, Serial No. 258,610

5 Claims. (Cl. 318—221)

1

The present invention relates to two-speed, single-phase induction motors, and more particularly to a two-speed, single-phase motor which requires only two primary windings.

Single-phase induction motors have a main primary winding and an auxiliary, or starting, primary winding which are displaced from each other, usually by ninety electrical degrees, on the primary member of the motor and which carry currents differing in time phase to produce a starting torque, the auxiliary winding usually being disconnected when the motor has accelerated to a predetermined speed. When operation at two different speeds is desired, two main primary windings having different numbers of poles are provided, and in the conventional arrangement, it is necessary to provide an auxiliary winding for each of the main windings, making a total of four primary windings. It is possible, by the use of a special starting switch, to eliminate one of the auxiliary windings and to arrange the motor so that it always starts on the same main winding and its associated auxiliary winding. After the starting switch operates, the motor continues to run on either one of the main windings, as desired. This arrangement requires only three primary windings, but the necessity of providing room for three windings in the slots of the stator presents a difficult design problem, usually requiring the use of relatively small wire with high copper loss, and also involves a difficult and expensive winding operation to insert the three windings in the slots.

The principal object of the present invention is to provide a two-speed, single-phase induction motor which requires only two primary windings.

A more specific object of the invention is to provide a two-speed, single-phase motor which has two primary windings, of different numbers of poles, arranged on the primary member of the motor so that at least some of the poles of one winding are in the proper position to serve as a starting winding for the other winding. The motor is provided with switching means arranged so that the motor always starts on one winding with certain poles of the other winding, which are in the proper position, connected to serve as a starting winding, the switching means being arranged so that the motor runs on either winding, as desired, after the starting switch has operated.

Other objects and advantages of the invention will be apparent from the following detailed description, taken in connection with the accompanying drawing, in which:

2

Figure 1:
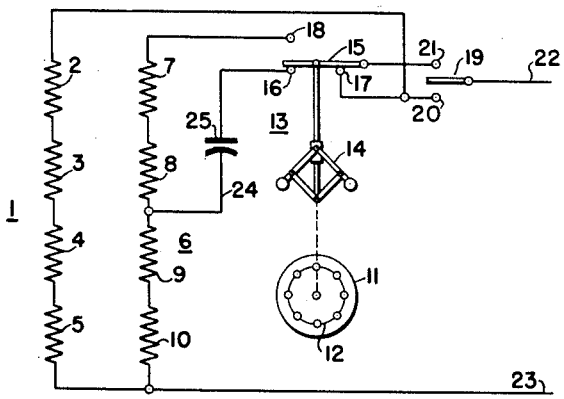
Figure 2:
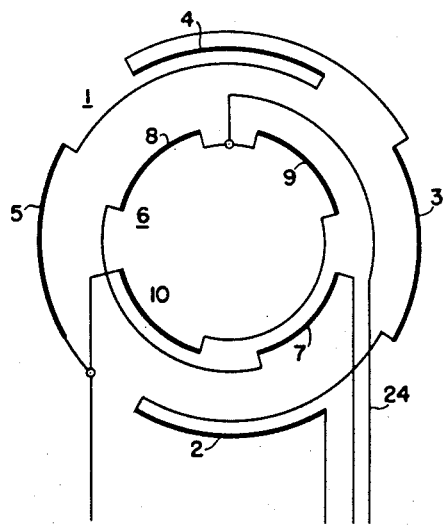

Figure 1 is a schematic wiring diagram showing a preferred embodiment of the invention; and Fig. 2 is a connection diagram of the primary windings.

While the invention is not limited to any particular number of poles in either of the two primary windings, or to any particular combination of speeds, it is most readily applicable to motors in which one primary winding has twice as many poles as the other, giving a speed ratio of 2 to 1. The particular motor shown in the drawing, for the purpose of illustration, has a four-pole winding for high-speed operation and an eight-pole winding for low-speed operation. The high-speed winding 1 is shown as having four pole groups 2, 3, 4 and 5, which may consist of any suitable number of coils connected together in any desired manner. As shown in Fig. 2, the four pole groups are connected together in series, with adjacent pole groups connected so as to be of opposite polarity to provide a four-pole field. The low-speed winding 6 is also shown as having four pole groups 7, 8, 9, and 10, which are connected together in series with all four pole groups of the same polarity, so that consequent poles of opposite polarity are formed between them, giving an eight-pole field. The primary windings 1 and 6 are arranged on the stator of the motor as shown in Fig. 2, with their pole groups displaced ninety electrical degrees, so that their physical relationship is essentially the same as that between the main and auxiliary windings of a conventional single-speed motor.

It will be evident that alternate pole groups of the low-speed winding are in the proper positions to be utilized as a starting winding for the high-speed winding, in the particular embodiment shown in which all the pole groups of the low-speed winding are of the same polarity. Alternate poles of the low-speed winding can, therefore, be utilized for starting the motor on the high-speed winding. Since this particular winding has four poles, either pair of opposite pole groups can be utilized, depending upon the desired direction of rotation. Accordingly, the low-speed winding is connected as shown in Fig. 2, with the physically opposite pole groups 7 and 8 connected together in series to form one section of the winding, and the intervening pole groups 9 and 10 connected in series to form another section, the two sections being connected together in series.

The motor has a rotor member 11 provided with a squirrel cage secondary winding 12. A speed-responsive switching means 13 is also provided, which may be actuated by a speed-responsive mechanism 14, of any suitable type, driven by the rotor 11 and actuating a movable switch member 15. The switch member 15 bridges stationary contacts 16 and 17 when the motor is at rest, or below the switch operating speed, and is moved to engage a stationary contact 18 when the motor exceeds the switch operating speed. A speed selector switch 19 is also provided having two contacts 20 and 21 for high-speed and low-speed operation of the motor, respectively. The speed selector switch 19 is connected to one side 22 of a single-phase supply line, and the primary windings 1 and 6 are connected together at one end and connected to the other side 23 of the line. The selector switch 19 may also serve as a line switch, as shown, or if desired, a separate line switch might be provided.

The electrical connections of the motor are shown in Fig. 1. As previously indicated, the windings 1 and 6 are connected together at one end and connected directly to the line. The other end of the high-speed winding 1 is connected directly to the contact 20 of the speed selector switch 19. The free end of the low-speed winding 6 is connected to the contact 18 of the speed-responsive switch 13. A tap connection 24 is provided between the two sections of the low-speed winding 6 and connected to the stationary contact 16 of the speed-responsive switch 13, a capacitor 25 preferably being inserted in this connection to provide the required phase difference in the currents in the two windings for starting. The stationary contact 17 of the speed-responsive switch 13 is connected to the contact 20 of the speed selector switch, and the switch member 15 is connected to the contact 21 of the speed selector switch.

The operation of this motor is as follows. When the motor is at rest, the switch arm 15 bridges the contacts 16 and 17, as shown in Fig. 1, and the pole groups 9 and 10 of the low-speed winding 6 are connected in parallel with the high-speed winding 1 through the connection 24 and the switch arm 15. To start the motor, the speed selector switch 19 may be placed on either contact 20 or 21, depending on the desired speed of operation. When the switch 19 is placed on the contact 20, the winding 1 and the parallel-connected pole groups 9 and 10 are connected directly to the line, while if the switch 19 is placed on the contact 21, the winding 1 and the paralleled pole groups 9 and 10 are connected to the line through the contact 17 and switch arm 15. Thus, in either position of the switch 19, the motor will start with the high-speed winding 1 as the main winding and the pole groups 9 and 10 of the low-speed winding serving as a starting winding.

When the motor has accelerated to the operating speed of the switch 13, the switch arm 15 is moved into engagement with the contact 18, thus interrupting the paralleling connection through the contact 16. If the switch 19 is on the contact 20, the high-speed winding 1 is directly connected to the line and the motor will continue to run at the high speed. If the switch 19 is on the contact 21, the low-speed winding 6 will be connected to the line through the contact 18 and switch arm 15, so that the motor will run at the low speed on the winding 6. Thus, it will be seen that with the speed selector switch in either position, the motor will start on the high-speed winding 1, and after the switch 13 has operated, it will run on either winding 1 or 6, as determined by the position of the speed selector switch 19.

It should now be apparent that a two-speed, single-phase motor has been provided which requires only two primary windings. This results in a material saving in cost, as compared to previous types of two-speed motors, since the use of only two primary windings greatly simplifies the winding operation and therefore materially reduces the cost of winding, as well as allowing more space in the slots for the windings, thus permitting the use of larger wire which reduces the copper losses and improves the efficiency. A specific embodiment of the invention has been shown for the purpose of illustration, but it will be obvious that the invention is not limited to the specific arrangement of windings shown, but may be applied to motors having windings with other combinations of pole numbers or different arrangements of poles, in any case in which at least some of the pole groups of one winding can be located in the proper position with respect to the other winding to serve as a starting winding. A capacitor has been shown for the purpose of producing a phase difference in the currents in the two windings during starting, but it will be apparent that any other suitable means might be utilized for producing the required phase difference, such as by using magnetic wedges in the slots of the pole groups which serve as a starting winding to increase the reactance of those pole groups.

Since the invention is capable of various modifications and embodiments, as indicated above, it is to be understood that although a specific embodiment has been shown for the purpose of illustration, the invention is not limited to this particular arrangement, but in its broadest aspects, it includes all equivalent embodiments and modifications which come within the scope of the appended claims.

I claim as my invention:

1. A two-speed, single-phase induction motor having relatively rotatable primary and secondary members, first and second primary windings on the primary member, said primary windings each comprising a plurality of pole groups and being arranged and connected to provide different numbers of poles, said second primary winding being disposed so that at least some of its pole groups lie between pole groups of the first primary winding, said last-mentioned pole groups of the second primary winding being separately connected together as one section of the winding, said section being connected to the remaining pole groups of the complete winding, a selector switch adapted to alternatively connect one or the other of the primary windings to a single-phase line for operation of the motor at different speeds, and a speed-responsive switch adapted when the motor is at rest to connect the first primary winding and said one section only of the second primary winding in parallel to the selector switch for connection to the line in either position of the selector switch, and the speed-responsive switch being adapted when the motor speed exceeds a predetermined value to interrupt the connection of said section of the second primary winding and to connect the entire second primary winding to the selector switch.

2. A two-speed, single-phase induction motor having relatively rotatable primary and secondary members, first and second primary windings on the primary member, said primary windings each comprising a plurality of pole groups and being arranged and connected to provide different numbers of poles, said second primary winding being disposed so that at least one pair of diametrically opposite pole groups lie between pole groups of the first primary winding, said diametrically opposite pole groups of the second primary winding being separately connected together as one section of the winding, said section being connected to the remaining pole groups of the complete winding, a selector switch adapted to alternatively connect one or the other of the primary windings to a single-phase line for operation of the motor at different speeds, and a speed-responsive switch adapted when the motor is at rest to connect the first primary winding and said one section only of the second primary winding in parallel to the selector switch for connection to the line in either position of the selector switch, and the speed-responsive switch being adapted when the motor speed exceeds a predetermined value to interrupt the connection of said section of the second primary winding and to connect the entire second primary winding to the selector switch.

3. A two-speed, single-phase induction motor having relatively rotatable primary and secondary members, first and second primary windings on the primary member, said primary windings each comprising a plurality of pole groups and being arranged and connected to provide different numbers of poles, said second primary windig being disposed so that at least some of its pole groups lie between pole groups of the first primary winding, said last-mentioned pole groups of the second primary winding being separately connected together as one section of the winding, said section being connected to the remaining pole groups of the complete winding, a selector switch having first and second contacts for alternatively connecting one or the other of the primary windings to a single-phase line for operation of the motor at different speeds, the first primary winding being permanently connected to the first contact of the selector switch, and a speed-responsive switch adapted when the motor is at rest to connect the first primary winding and said one section only of the second primary winding in parallel to both contacts of the selector switch for connection to the line in either position of the selector switch, and the speed-responsive switch being adapted when the motor speed exceeds a predetermined value to interrrupt the connection of said section of the second primary winding and the connection of the first primary winding to the second contact of the selector switch and to connect the entire second primary winding to said second contact.

4. A two-speed, single-phase induction motor having relatively rotatable primary and secondary members, first and second primary windings on the primary member, said primary windings each comprising a plurality of pole groups and being arranged and connected to provide different numbers of poles, said second primary winding being disposed so that at least one pair of diametrically opposite pole groups lie between pole groups of the first primary winding, said diametrically opposite pole groups of the second primary winding being separately connected together as one section of the winding, said section being connected to the remaining pole groups of the complete winding, a selector switch having first and second contacts for alternatively connecting one or the other of the primary windings to a single-phase line for operation of the motor at different speeds, the first primary winding being permanently connected to the first contact of the selector switch, and a speed-responsive switch adapted when the motor is at rest to connect the first primary winding and said one section only of the second primary winding in parallel to both contacts of the selector switch for connection to the line in either position of the selector switch, and the speed-responsive switch being adapted when the motor speed exceeds a predetermined value to interrupt the connection of said section of the second primary winding and the connection of the first primary winding to the second contact of the selector switch and to connect the entire second primary winding to said second contact.

5. A two-speed, single-phase induction motor having relatively rotatable primary and secondary members, first and second multipolar primary windings physically displaced from each other on the primary member, said first primary winding being connected with adjacent pole groups of opposite polarity and said second primary winding being connected with all pole groups of the same polarity, the second primary winding consisting of two series-connected sections each comprising alternate pole groups connected in series, a speed selector switch having first and second contacts for alternatively connecting one or the other of the primary windings to a single-phase line for operation of the motor at different speeds, the first primary winding being permanently connected to the first contact of the selector switch, and a speed-responsive switch adapted when the motor is at rest to connect the first primary winding and one section only of the second primary winding in parallel to both contacts of the selector switch for connection to the line in either position of the selector switch, and the speed-responsive switch being adapted when the motor speed exceeds a predetermined value to interrupt the connection of said one section of the second primary winding and the connection of the first primary winding to the second contact of the selector switch and to connect the entire second primary winding to said second contact.

JOHN C. BURDETT.

References Cited in the file of this patent
UNITED STATES PATENTS

| Number | Name | Date |
|---|---|---|
| 2,488,658 | Brennen | Nov. 22, 1949 |
| 2,564,633 | Ziegler | Aug. 14, 1951 |